(12) United States Patent
Fukui et al.

(10) Patent No.: US 8,541,103 B2
(45) Date of Patent: Sep. 24, 2013

(54) SILICONE POLYMER PARTICLE AND SILICONE COMPOSITION CONTAINING SAME

(75) Inventors: Yoshifumi Fukui, Toyonaka (JP); Satoshi Sugiyama, Settsu (JP); Akira Takaki, Kobe (JO)

(73) Assignee: Kaneka Corporation, Osaka (JP)

( * ) Notice: Subject to any disclaimer, the term of this patent is extended or adjusted under 35 U.S.C. 154(b) by 617 days.

(21) Appl. No.: 11/791,216

(22) PCT Filed: Dec. 2, 2005

(86) PCT No.: PCT/JP2005/022192
§ 371 (c)(1), (2), (4) Date: May 22, 2007

(87) PCT Pub. No.: WO2006/059719
PCT Pub. Date: Jun. 8, 2006

(65) Prior Publication Data
US 2007/0298256 A1   Dec. 27, 2007

(30) Foreign Application Priority Data

Dec. 3, 2004 (JP) ................................. 2004-351717
Jun. 28, 2005 (JP) ................................. 2005-188481

(51) Int. Cl.
*C08F 283/12* (2006.01)
*C08F 230/08* (2006.01)
*B32B 5/16* (2006.01)

(52) U.S. Cl.
USPC ...... 428/402.24; 525/478; 525/100; 526/279; 526/319

(58) Field of Classification Search
USPC ................. 428/402, 407, 447, 477; 525/478, 525/106
See application file for complete search history.

(56) References Cited

U.S. PATENT DOCUMENTS

| 5,538,793 | A | * | 7/1996 | Inokuchi et al. | 428/407 |
| 6,339,127 | B1 | * | 1/2002 | Miyatake et al. | 525/106 |
| 7,288,322 | B2 | * | 10/2007 | Bosshammer | 428/447 |
| 2002/0192367 | A1 | * | 12/2002 | Barbuzzi et al. | 427/180 |
| 2007/0112157 | A1 | * | 5/2007 | Hashimoto et al. | 526/279 |

FOREIGN PATENT DOCUMENTS

| EP | 1614700 A1 | 1/2006 |
| JP | 60-088040 A | 5/1985 |
| JP | 62-223722 A | 10/1987 |
| JP | 02-163127 A | 6/1990 |
| JP | 5-194740 A | 8/1993 |
| JP | 07-150047 | 6/1995 |
| JP | 7-150047 A | 6/1995 |
| JP | 7-294701 A | 11/1995 |
| JP | 2832143 B2 | 12/1998 |
| JP | 11-148009 | 6/1999 |
| JP | 11-148009 A | 6/1999 |
| JP | 2000-264968 A | 9/2000 |
| JP | 2002-327114 A | 11/2002 |
| JP | 2004-168935 A | 6/2004 |
| WO | WO 2004/092236 A1 | 10/2004 |

* cited by examiner

*Primary Examiner* — James J Seidleck
*Assistant Examiner* — S. Camilla Pourbohloul
(74) *Attorney, Agent, or Firm* — Sughrue Mion, PLLC

(57) ABSTRACT

The present invention provides silicone polymer particles having excellent tensile properties and excellent transparency and also provides a silicone composition. The present invention relates to silicone polymer particles having a silicone core-alkoxysilane condensate shell structure in which silicone particles with a volume-average particle diameter of 0.001 μm to 1.0 μm are coated with an alkoxysilane condensate, and also relates to a silicone composition containing (A) the silicone polymer particles, (B) a polyorganosiloxane having at least one alkenyl group in its molecule, and (C) a curing agent. The present invention further relates to respective manufacturing methods of the silicone polymer particles and the silicone composition.

11 Claims, 1 Drawing Sheet

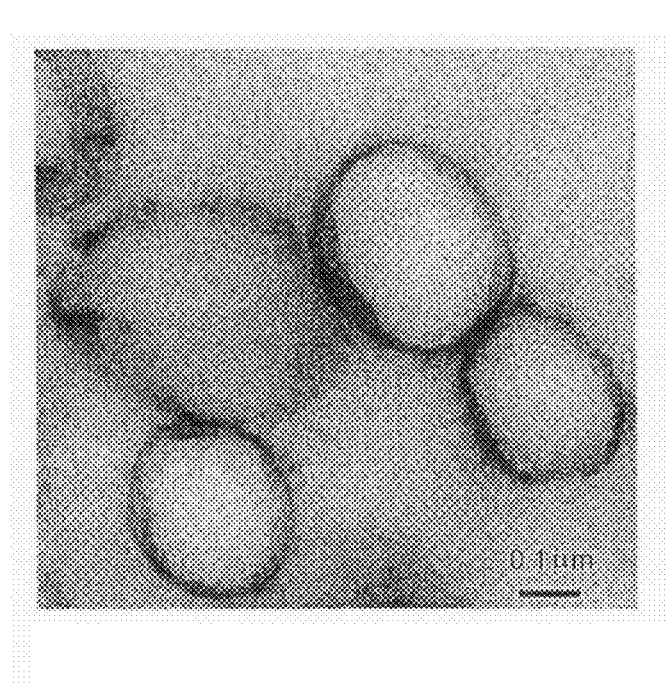

SILICONE POLYMER PARTICLE AND SILICONE COMPOSITION CONTAINING SAME

This application is a National Stage of PCT/JP2005/022192 filed on Dec. 2, 2005, claiming priority based on Japanese Application No. 2004-351717 filed on Dec. 3, 2004 and No. 2005-188481 filed on Jun. 28, 2005, the contents of which are incorporated herein by reference in their entirety.

TECHNICAL FIELD

The present invention relates to a silicone composition which has excellent tensile properties and transparency containing silicone polymer particles and a polyorganosiloxane having at least one alkenyl group in its molecule. The silicone composition contains specified silicone polymer particles as component (A), a polyorganosiloxane having at least one alkenyl group in its molecule as component (B), and a curing agent as component (C).

BACKGROUND ART

Silicone compositions are excellent in heat resistance, cold resistance, weather resistance, light resistance, chemical stability, electric properties, flame retardancy, water resistance, transparency, coloring properties, non-cohesiveness, and non-corrosiveness and are used in various industries, but have the disadvantage of low strength. Although silica is generally added for improving the strength, there occurs the problem of opacifying the compositions or increasing specific gravities. Also, it is known that silicone rubber powder, polyorganosilsesquioxane powder, or silicone rubber powder coated with polyorganosilsesquioxane is added for improving the strength. However, the strength improving effect is not sufficient, and, particularly, there is the problem of adversely affecting transparency due to the large particle diameter (refer to, for example, Patent Documents 1 to 3).

Further, a rubber portion of silicone rubber powder or silicone rubber powder coated with polyorganosilsesquioxane is prepared by crosslinking with addition reaction of vinyl group-containing polyorganosiloxane and hydrogen organopolysiloxane in the presence of a platinum catalyst. However, this method has the problem of difficulty in synthesizing small particles having a particle diameter of 1 μm or less and difficulty in controlling the particle diameter. In addition, the method is economically disadvantageous because an expensive platinum catalyst is used (refer to, for example, Patent Document 2).

As described above, in the present situation, there is demand for an additive capable of increasing the strength of silicone compositions and maintaining transparency.

Patent Document 1: Japanese Unexamined Patent Application Publication No. 2-163127

Patent Document 2: Japanese Patent No. 2832143

Patent Document 3: Japanese Unexamined Patent Application Publication No. 7-150047

DISCLOSURE OF THE INVENTION

Problems to be Solved by the Invention

The present invention provides a silicone composition having excellent tensile properties and high transparency and silicone polymer particles therefor, which can solve the problems.

Means for Solving the Problems

As a result of intensive research for solving the problems, the inventors have found that a silicone composition containing specified silicone polymer particles, polyorganosiloxane having at least one alkenyl group in its molecule, and a curing agent has high tensile properties and transparency, resulting in the achievement of the present invention.

Namely the present invention relates to silicone polymer particles having a silicone core-alkoxysilane condensate shell structure in which silicone particles with a volume-average particle diameter of 0.001 to 1.0 μm are coated with an alkoxysilane condensate.

In a preferred embodiment, in the silicone polymer particles, the volume-average particle diameter of the silicone particles is 0.01 to 1.0 μm.

In a preferred embodiment, the silicone polymer particles are further surface-treated.

In a preferred embodiment, the silicone polymer particles contain an alkenyl group in the shell or the surface of the polymer particles.

The present invention also relates to a silicone composition containing (A) the silicone polymer particles, (B) a polyorganosiloxane having at least one alkenyl group in its molecule, and (C) a curing agent.

In a preferred embodiment, in the silicone composition, the curing agent is a combination of an organohydrogen polysiloxane and a hydrosilylation catalyst or an organic peroxide.

In a preferred embodiment, in the silicone composition, the component (A) is uniformly dispersed in the composition by a master batch method.

The present invention further relates to a method of manufacturing silicone polymer particles, the method including coating silicone particles, which are produced by emulsion polymerization, with an alkoxysilane condensate by condensation reaction of alkoxysilane.

In a preferred embodiment, in the method of manufacturing the silicone polymer particles, the silicone particles are obtained by emulsion polymerization of organosiloxane having a cyclic structure and used as a raw material.

In a preferred embodiment, in the method of manufacturing the silicone polymer particles, the condensation reaction of alkoxysilane is performed under acid conditions.

In a preferred embodiment, the method of manufacturing the silicone polymer particles further includes surface treatment.

The present invention further relates to a method of manufacturing a silicone composition, the method including mixing (a) the silicone polymer particles, (B) a polyorganosiloxane having at least one alkenyl group in its molecule, and (C) a curing agent, and uniformly dispersing the component (A) in the composition by a master batch method.

The present invention will be described in detail below.

The present invention relates to specified silicone polymer particles, a silicone composition containing (A) the specified silicone polymer particles, (B) a polyorganosiloxane having at least one alkenyl group in its molecule, and (C) a curing agent, and methods of manufacturing therefor.

<(A) Silicone Polymer Particles>

The silicone polymer particles used as the component (A) in the present invention will be described.

The silicone polymer particles of the present invention have a silicone core-alkoxysilane condensate shell structure in which silicone particles having a volume-average particle diameter of 0.001 to 1.0 μm are coated with an alkoxysilane condensate.

The component (A) can be used by mixing in the polyorganosiloxane used as the component (B) and having at least one alkenyl group in its molecule. In this case, it is possible to maintain the transparency of the component (B) serving as a matrix resin and increase strength.

The composition ratio and the like of the component (A) are not particularly limited as long as the silicone particles are coated with the alkoxysilane condensate. However, in the polymer particles, 40 to 95% by weight of the silicone particles are preferably coated with 5 to 60% by weight of the alkoxysilane condensate (total content of 100% by weight of the silicone particles and the alkoxysilane condensate). In the polymer particles, 45 to 95% by weight of the silicone particles are more preferably coated with 5 to 55% by weight of the alkoxysilane condensate. When the content of the silicone particles is less than 40% by weight, the difference in refractive index between the silicone polymer particles and the matrix resin increases, and therefore the transparency of the composition tends to decrease. When the content of the alkoxysilane condensate is less than 5% by weight, improvement in strength of the composition tends to become insufficient.

The silicone particles used are prepared by polymerizing an organosiloxane having a structural unit represented by general formula (2):

$$R_mSiO_{(4-m)/2} \quad (2)$$

(wherein R each represents a substituted or unsubstituted monovalent hydrocarbon group and may be the same or different, and m represents an integer of 0 to 3).

The content of silicone particles having a structural unit of the formula (2) in which m=2 is preferably 80 mol % or more and more preferably 90 mol % or more of the total of the silicone particles. When the content of such silicone particles is less than 80 mol %, the flexibility of the silicone particles tends to be degraded, and, therefore the impact resistance of the silicone composition at a low temperature and the effect of stress relaxation may be decreased.

The organosiloxane has a linear, branched, or cyclic structure, but an organosiloxane having a cyclic structure is preferably used from the viewpoint of easy availability and cost.

Examples of a substituted or unsubstituted monovalent hydrocarbon group represented by R which the organosiloxane has include alkyl groups having 1 to 4 carbon atoms, such as a methyl group, an ethyl group, a propyl group, and a butyl group; aryl groups having 6 to 24 carbon atoms, such as a phenyl group, a naphthyl group, and a toluoyl group; and those hydrocarbon groups substituted by a cyano group or the like.

Examples of the organosiloxane include cyclic compounds such as hexamethylcyclotrisiloxane (D3), octamethylcyclotetrasiloxane (D4), decamethylcyclopentasiloxane (D5), dodecamethylcyclohexasiloxane (D6), and trimethyltriphenylcyclotrisiloxane; and linear or branched organosiloxanes. These organosiloxanes can be used alone or in combination of two or more.

The method of manufacturing the silicone particles used in the present invention is not particularly limited, and the silicone particles can be prepared by usual emulsion polymerization. In view of controllability of the particle diameter and convenience, the silicone particles are preferably obtained by emulsion polymerization.

The silicone particles can be produced by, for example, a usual emulsion polymerization method under acidic or basic conditions. However, reaction under acidic conditions is more advantageous than reaction under alkali conditions because gelation in alkoxysilane condensation reaction, which will be described below, can be easily suppressed. For example, various raw materials including the organosiloxane are emulsified together with an emulsifier and water using a homomixer, a colloid mill, or a homogenizer, and then the pH of the system is adjusted to preferably 5 or less and more preferably 4 or less using an acid component, followed by polymerization by heating.

The acid component is preferably capable of stably advancing emulsion polymerization and has an emulsifying ability. Examples of such an acid component include alkylbenzene sulfonic acid, alkylsulfuric acid, and alkylsulfosuccinic acid. In these examples of the acid component, alkyl preferably has 1 to 20 carbon atoms. This applies to examples of the emulsifier described below.

The whole of the raw materials may be added at a time, and the mixture may be stirred for a predetermined time, and then adjusted to any desired pH value, or part of the raw materials may be charged and adjusted to any desired pH, and then the remaining raw materials may be successively added to the resultant emulsion.

Although the pH in polymerization is not particularly limited, the pH is preferably adjusted to pH=5 or less and more preferably pH=4 or less because the polymerization sufficiently proceeds. When the organosiloxane is successively added, the organosiloxane may be added as it is or as an emulsion liquid prepared by mixing with water and the emulsifier. However, the method of adding in an emulsion state is preferably used from the viewpoint of polymerization rate.

Although the reaction temperature and time are not particularly limited, the reaction temperature is preferably 0 to 100° C. and more preferably 50° C. to 95° C. from the viewpoint of the ease of reaction control. The reaction time is preferably 1 to 100 hours and more preferably 3 to 50 hours.

In the polymerization under acidic conditions, generally, Si—O—Si bonds which form the skeleton of the silicone particles are in equilibrium between cutting and bonding. The equilibrium changes with temperatures, and high-molecular-weight silicone particles are more easily produced as the temperature decreases. Therefore, in order to produce high-molecular-weight silicone particles, it is preferred to perform aging at a temperature lower than the polymerization temperature after polymerization by heating. Specifically, the polymerization is performed at 50° C. or more, heating is stopped when the polymerization conversion rate reaches 75% to 90%, and then aging can be performed at preferably 10° C. to 50° C. and more preferably 20° C. to 45° C. for 5 to 100 hours.

The polymerization conversion rate means the rate of conversion of the organosiloxane used as a raw material to the silicone particles.

The amount of the water used in the emulsion polymerization is not particularly limited and may be an amount sufficient to emulsify and disperse the raw materials. The amount is generally 1 to 20 times by weight the total amount of the raw materials.

The emulsifier used in the emulsion polymerization is not particular limited as long as the emulsifying ability is not lost in the reaction pH region, and any known emulsifier can be used. Examples of the emulsifier include alkylbenzene sulfonic acid, sodium alkylbenzene sulfonate, sodium alkylsulfate, sodium alkylsulfosuccinate, and sodium polyoxyethylene nonyl phenyl ether sulfonate.

The amount of the emulsifier used is not particularly limited and may be appropriately controlled according to the particle size of the target silicone particles. From the viewpoint that sufficient emulsifiability can be obtained, and that the physical properties of the resultant silicone particles and the silicone polymer particles used as the component (A) and prepared from the silicone particles are not adversely affected, 0.005 to 20% by weight of the emulsifier is preferably used in the emulsion, and 0.05 to 10% by weight is more preferred.

The particle diameter of the silicone particles can be controlled by changing the amount of the emulsifier used using an ordinary emulsion polymerization technique. For example, the silicone particles having a relatively small particle diameter can be stably produced by emulsion polymerization using alkylbenzene sulfonic acid at a proper concentration.

The volume-average particle diameter of the silicone particles is 0.001 μm to 1.0 μm. The upper limit is preferably 0.8 μm or less and more preferably 0.5 μm or less. The lower limit is preferably 0.004 μm or more and more preferably 0.01 μm or more. It is difficult to stably obtain the silicone particles having a volume-average particle diameter of less than 0.001 μm. When the volume-average particle diameter exceeds 1.0 μm, the transparency and impact resistance of a final molded product may be degraded. The volume-average particle diameter of the silicone particles can be measured in a latex state.

The volume-average particle diameter can be measured using, for example, a nanotrack particle diameter analyzer UPA150 (manufactured by Nikkiso Co., Ltd.).

In order to stabilize the silicone particles and control the particle diameter, a small amount of a seed polymer with a small particle diameter may be added.

As the seed polymer, a rubber component such as butyl acrylate rubber or butadiene rubber may be used, and a hard polymer such as a butyl acrylate-styrene copolymer, a butyl acrylate-butadiene copolymer, a butyl acrylate-acrylonitrile copolymer, a butyl acrylate-styrene-acrylonitrile copolymer, or a styrene-acrylonitrile copolymer can be also used. In particular, the seed polymer preferably has a low molecular weight and a small particle diameter from the viewpoint of narrowing the particle diameter distribution of the silicone particles.

The particle diameter of the seed polymer can be appropriately determined according to the final particle diameter. However, in general, the volume-average particle diameter is preferably determined in the range of 0.001 to 0.1 μm.

Although the seed polymer can be produced by usual emulsion polymerization, the synthesis method thereof is not particularly limited.

Examples of a radical initiator usable in polymerization for the seed polymer include organic peroxides such as paramenthane hydroperoxide, cumene hydroperoxide, tert-butyl hydroperoxide, benzoyl peroxide, and tert-butyl peroxyisopropyl carbonate; inorganic peroxides such as potassium persulfate and ammonium persulfate; and azo compounds such as 2,2'-azobisisobutyronitrile and 2,2'-azobis-2,4-dimethylvaleronitrile.

The polymerization is completed even at a low polymerization temperature in a redox catalyst system such as ferrous sulfate-sodium formaldehyde sulfoxylate-disodium ethylenediaminetetraacetate, ferrous sulfate-glucose-sodium pyrophosphate, or ferrous sulfate-sodium pyrophosphate-sodium phosphate.

Also, in order to decrease the molecular weight, a chain transfer agent such as alkyl mercaptan may be used in polymerization for the seed polymer.

In synthesis of the silicone particles used in the present invention, a crosslinking agent or a graft-linking agent can be added for controlling the elasticity of the silicone particles according to demand.

Examples of the crosslinking agent usable in synthesis of the silicone particles of the present invention include trifunctional crosslinking agents containing three functional groups which can be involved in condensation reaction, such as methyltrimethoxysilane, phenyltrimethoxysilane, and ethyltriethoxysilane; tetrafunctional crosslinking agents containing four functional groups which can be involved in condensation reaction, such as tetraethoxysilane, 1,3-bis[2-(dimethoxymethylsilyl)ethyl]benzene, 1,4-bis[2-(dimethoxymethylsilyl)ethyl]benzene, 1,3-bis[1-(dimethoxymethylsilyl)ethyl]benzene, 1,4-bis[1-(dimethoxymethylsilyl)ethyl]benzene, 1-[1-(dimethoxymethylsilyl)ethyl]-3-[2-(dimethoxymethylsilyl)ethyl]benzene, and 1-[1-(dimethoxymethylsilyl)ethyl]-4-[2-dimethoxymethylsilyl]ethyl]benzene; and oligomers prepared by condensation of the alkoxy groups of these crosslinking agents. These crosslinking agents can be used alone or in combination of two or more according to demand.

The amount of the crosslinking agent added is preferably 0.1 to 10 parts by weight relative to 100 parts by weight of organosiloxane. When the amount of the crosslinking agent added exceeds 10 parts by weight, the flexibility of the silicone particles tends to be degraded, and the impact resistance of the silicone composition at a low temperature may be decreased. The degree of crosslinking can be changed by controlling the amount of the crosslinking agent added to control the elasticity of the silicone particles to any level.

Examples of the grafting agent usable in the present invention include p-vinylphenylmethyl dimethoxysilane, p-vinylphenylethyl dimethoxysilane, 2-(p-vinylphenyl)ethylmethyl dimethoxysilane, 3-(p-vinylbenzoyloxy)propylmethyl dimethoxysilane, vinylmethyl dimethoxysilane, tetravinyltetramethyl cyclosiloxane, allylmethyl dimethoxysilane, mercaptopropylmethyl dimethoxysilane, γ-methacryloxypropylmethyl dimethoxysilane, p-vinylphenyl trimethoxysilane, 2-(p-vinylphenyl)ethyl trimethoxysilane, 3-(p-vinylbenzoyloxy)propyl trimethoxysilane, vinyltrimethoxysilane, allyltrimethoxysilane, mercaptopropyl trimethoxysilane, γ-methacryloxypropyl trimethoxysilane, and the like.

The amount of the grafting agent used is preferably 0.1 to 10% by weight relative to the amount of the organosiloxane used. When the amount of the grafting agent used exceeds 10% by weight, the flexibility of the silicone particles tends to be degraded, and the low-temperature impact resistance of the silicone composition may be decreased.

The alkoxysilane compound used in the present invention is a component used for covering the surface of the silicone particles with the condensate thereof to form a shell of each silicone polymer particle used as the component (A), for securing compatibility between the components (A) and (B) to uniformly disperse the component (A) in the silicone composition, and for improving the strength of the silicone composition.

In the present invention, the silicone particles are coated with the alkoxysilane condensate to prepare the silicone polymer particles used as the component (A) having a silicone core-alkoxysilane condensate shell structure.

In other words, the method of manufacturing the silicone polymer particles of the present invention is characterized in that the silicone particles produced by emulsion polymerization are coated with the alkoxysilane condensate by condensation reaction of an alkoxysilane compound.

Examples usable as the alkoxysilane compound in the present invention include monofunctional alkoxysilane compounds represented by general formula (3), difunctional alkoxysilane compounds represented by general formula (4), trifunctional alkoxysilane compounds represented by general formula (5), tetrafunctional alkoxysilane compounds represented by general formula (6), and partial condensates thereof (oligomers produced by condensation of alkoxy groups).

In general formula (3), $R^{12}$ represents an alkyl group, and $R^{13}$, $R^{14}$, and $R^{15}$ represent the same or different monovalent organic groups.

In general formula (4), $R^{22}$ and $R^{23}$ represent the same or different alkyl groups, and $R^{24}$ and $R^{25}$ represent the same or different monovalent organic groups.

In general formula (5), $R^{32}$, $R^{33}$, and $R^{34}$ represent the same or different alkyl groups, and $R^{35}$ represents a monovalent organic group.

In general formula (6), $R^{42}$, $R^{43}$, $R^{44}$, and $R^{45}$ represent the same or different alkyl groups.

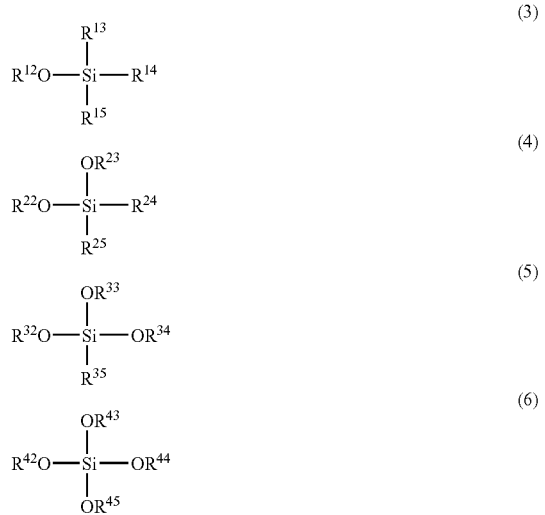

Examples of alkyl groups in general formulae (3) to (6) include alkyl groups having 1 to 6 carbon atoms, such as a methyl group, an ethyl group, a propyl group, a n-propyl group, an isopropyl group, a n-butyl group, an isobutyl group, a sec-butyl group, a tert-butyl group, a pentyl group, and a hexyl group.

Examples of monovalent organic groups include monovalent organic groups other than an alkoxy group, such as alkyl groups having 1 to 10 carbon atoms (e.g., a methyl group, an ethyl group, a propyl group, and a butyl group), alkenyl groups having 2 to 10 carbon atoms (e.g., a vinyl group, an allyl group, a butenyl group, and a hexenyl group), aryl groups (e.g., a phenyl group and a naphthyl group), and aralkyl groups (e.g., a benzyl group and a phenylethyl group).

From the viewpoint that an alkenyl group can be introduced by a simple operation, and the polymer particles and the matrix resin can be efficiently bonded, the shell preferably has an alkenyl group. Namely, in general formulae (3) to (6), the alkoxysilane compound having an alkenyl group as a monovalent organic group is preferably used.

The alkoxysilane condensate used in the present invention can be prepared by hydrolysis and condensation reaction of the alkoxysilane compound. Preferred examples of a combination of alkoxysilane compounds include i) a trifunctional alkoxysilane compound represented by formula (5) and/or a partial condensate thereof, ii) a tetrafunctional alkoxysilane compound represented by formula (6) and/or a partial condensate thereof, and iii) a mixture of a trifunctional alkoxysilane compound represented by formula (5) and/or a partial condensate thereof and a tetrafunctional alkoxysilane compound represented by formula (6) and/or a partial condensate thereof at a desired ratio. In addition, a monofunctional alkoxysilane compound represented by formula (3) and a difunctional alkoxysilane compound represented by formula (4) and/or a partial condensate thereof may be added to each of the alkoxysilane compounds i) to iii).

As the alkoxysilane compound used in the present invention, the same as the above-described crosslinking agent and the grafting agent can be used.

Among these alkoxysilane compounds, a raw material containing a tetrafunctional alkoxysilane compound and a partial condensate thereof is preferably used from the viewpoint of high strength of the shell obtained thereby.

As the polymerization method for preparing the component (A) by condensation reaction of the alkoxysilane compound with the silicone particles, emulsion polymerization can be used. Although general conditions for emulsion polymerization can be employed, particular care is preferably taken to the polymerization temperature. The polymerization temperature is preferably 20° C. to 85° C. and more preferably 30° C. to 75° C. The polymerization time is preferably 1 to 50 hours and more preferably 3 to 40 hours.

The condensation reaction of the alkoxysilane compound by the emulsion polymerization under acid conditions is more advantageous than that under alkali conditions because geletion in the condensation reaction of the alkoxysilane compound can be easily suppressed. Further, the reaction under the acid conditions is convenient and preferred because a polymerization solution of the silicone particles synthesized in the emulsion polymerization system under the acid conditions can be used as it is or only after dilution with water.

A method of separating a polymer from the silicone polymer latex produced by the emulsion polymerization is not particularly limited. An example of the method includes adding a metal salt (e.g., calcium chloride, magnesium chloride, or magnesium sulfate) to the latex to solidify the latex, followed by separation, water washing, dehydration, drying, and the like. A spray drying method can also be used.

In the present invention, a master batch method is preferably used from the viewpoint that the component (A) can be uniformly dispersed in the matrix resin, and a transparent composition can be obtained. The master batch method is a method in which an alcohol (e.g., methanol, ethanol, or 2-propanol), a ketone (e.g., methyl ethyl ketone, methyl isobutyl ketone, or cyclohexanone), or the like is added to the latex solution to release the emulsion state of the particles and gently aggregate the particles, the precipitate obtained by centrifugal sedimentation is re-dissolved in a proper solvent (e.g., toluene, xylene, or hexane) and then mixed with the matrix resin, and then the solvent is distilled off.

From the viewpoint of transparency and impact resistance after mixing with the matrix resin, the volume-average particle diameter of the silicone polymer particles as the component (A) prepared as described above is preferably 0.001 μm to 1.0 μm. The upper limit is more preferably 0.8 μm or less and still more preferably 0.5 μm or less. The lower limit is more preferably 0.004 μm or more and still more preferably 0.01 μm or more.

In the present invention, since the particle diameter of the silicone polymer particles with the silicone core-alkoxysilane shell structure is substantially not much different from that of the silicone particles used, the volume-average particle diameter of the silicone particles in a latex state can be handled as the volume-average particle diameter of the silicone polymer particles with the core-shell structure. In addition, in the present invention, the particle diameter of the silicone polymer particles with the core-shell structure is substantially not much changed by the surface treatment described below. Therefore, the volume-average particle diameter of the silicone polymer particles with the core-shell structure in a latex state (i.e., the volume-average particle diameter of the silicone particles in a latex state) can be handled as the volume-average particle diameter of the surface-treated silicone polymer particles.

In the present invention, the silicone polymer particles used as the component (A) is preferably further surface-treated. The surface treatment can further improve affinity between the components (A) and (B). In addition, when organohydrogen polysiloxane and a hydrosilylation catalyst are used as the component (C), the surface treatment is preferred for decreasing silanol groups, which cause inhibition against curing by hydrosilylation reaction of the components (B) and (C), in the surface of the component (A). Furthermore, a functional group (e.g., an alkenyl group or an alkynyl group) reactive with the curing agent as the component (C) can be introduced into the surface of the component (A) by the surface treatment, thereby improving the strength of the whole silicone composition.

Examples of a surface treatment agent include chlorosilanes such as trimethylchlorosilane and dimethyldichlorosilane; disiloxanes such as hexamethyldisiloxoane; silazanes such as hexamethyl(di)silazane; and alkoxysilanes such as trimethylmethoxysilane and trimethylethoxysilane.

Examples of a surface treatment agent used for introducing a functional group (functional group reactive with the curing agent as the component (C)) having bondability to organohydrogen polysiloxane or an organic peroxide into the surface of the component (A) generally include alkenylsilanes, such as chlorodimethylvinylsilane, dichloromethylvinylsilane, dichlorodivinylsilane, and trichlorovinylsilane.

These surface treatment agents can be used alone or in combination of two or more.

From the viewpoint that the component (A) can be efficiently bonded to the matrix resin, the surface of the polymer particles preferably has an alkenyl group.

The amount of the surface treatment agent added is preferably 2 to 1000 parts by weight and more preferably 10 to 400 parts by weight relative to 100 parts by weight of the silicone polymer particles before the surface treatment. When the amount of the surface treatment agent added is less than 2 parts by weight, affinity between the components (A) and (B) cannot be sufficiently improved, and silanol groups on the surface of the component (A) cannot be sufficiently decreased. When the amount exceeds 1000 parts by weight, the surface treatment agent which cannot react with silanol groups on the surface of the component (A) may be mixed as an impurity in the composition.

The amount of the component (A) mixed is preferably 2 to 50% by weight in the silicone composition. When the amount of the component (A) mixed exceeds 50% by weight, the transparency of the composition may be decreased, and when the amount is less than 2% by weight, the effect of improving strength of the composition may become insufficient.

<(B) Polyorganosiloxane Having at Least One Alkenyl Group in its Molecule>

The polyorganosiloxane used as the component (B) in the present invention and having at least one alkenyl group in its molecule is represented by the following average composition formula (1):

$$R^1{}_n SiO_{(4-n)/2} \quad (1)$$

(wherein $R^1$s are the same or different unsubstituted or substituted monovalent hydrocarbon groups, and n is a positive number of 1.98 to 2.02).

An unsubstituted or substituted monovalent hydrocarbon group represented by $R^1$ in the above formula is an unsubstituted or substituted monovalent hydrocarbon group preferably having 1 to 10 carbon atoms and more preferably 1 to 8 carbon atoms. Specific examples include alkyl groups such as a methyl group, an ethyl group, a propyl group, and a butyl group; cycloalkyl groups such as a cyclohexyl group; alkenyl groups such as a vinyl group, an allyl group, a butenyl group, and a hexenyl group; aryl groups such as a phenyl group and a tolyl group; and these groups in each of which hydrogen atoms bonded to carbon atoms are partially or entirely substituted by halogen atoms or cyano groups, such as a chloromethyl group, a trifluoropropyl group, and a cyanoethyl group. In particular, in view of heat resistance, a methyl group, a phenyl group, and a vinyl group are preferred.

In formula (1), a plurality of $R^1$ may be the same or different.

In this case, it is necessary for $R^1$ to have at least one alkenyl group. The content of an alkenyl group in $R^1$ is preferably 0.001 to 20 mol % and particularly preferably 0.025 to 5 mol %.

Although the component (B) represented by formula (1) is basically preferably linear, the component (B) may have a different molecular structure, such as a branched or cyclic structure, or may be a mixture of two or more.

Further, from the viewpoint of viscosity easy to handle and easy availability, the average polymerization degree of the component (B) is preferably 50 to 10,000 and more preferably 100 to 3,000.

The component (B) can be produced by a general known method as long as the limitation of formula (1) is satisfied.

The amount of the component (B) mixed is preferably 50 to 98% by weight in the silicone composition.

<(C) Curing Agent>

In the present invention, the curing agent can be mixed with the composition containing the components (A) and (B).

As the curing agent, a known curing agent, e.g., a combination of organohydrogen polysiloxane and a hydrosilylation catalyst or an organic peroxide can be preferably used.

The organohydrogen polysiloxane usable as the curing agent may be linear, branched chain, or cyclic as long as it contains at least two hydrogen atoms directly bonded to a silicon atom in its molecule. From the viewpoint of easy availability, the degree of polymerization is preferably 300 or less. Specific examples include disilicone terminated with a dimethylhydrogensilyl group, a copolymer of a dimethylsiloxane unit, a methylhydrogen siloxane unit, and a terminal trimethylsiloxy group, a low-viscosity fluid including a dimethylhydrogen siloxane unit ($H(CH_3)_2SiO_{0.5}$ unit) and a $SiO_2$ unit, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane.

The organohydrogen polysiloxane can be produced by, for example, a general known method.

From the viewpoint that the composition having sufficient hardness and strength can be obtained, the amount of the organohydrogen polysiloxane added as the curing agent is preferably 50 to 500 mol % and more preferably 80 to 200 mol % in terms of the ratio of hydrogen atoms directly bonded to a silicon atom to an alkenyl group of the component (B).

The hydrosilylation catalyst can be used as the curing agent together with the organohydrogen polysiloxane.

As the hydrosilylation catalyst, for example, a platinum catalyst, a palladium catalyst, or a rhodium catalyst can be added.

Examples usable as the platinum catalyst include known platinum catalysts, such as elemental platinum; platinum compounds; platinum complexes; chloroplatinic acid; and complexes of chloroplatinic acid and alcohol compounds, aldehyde compounds, ether compounds, or olefins.

For example, when the platinum catalyst is used, the amount of the hydrosilylation catalyst added is preferably in the range of 1 to 2,000 ppm in terms of platinum atom relative to the component (B) from the viewpoint of sufficient curing of the composition and prevention of coloring. This applies to the use of the palladium catalyst or the rhodium catalyst.

Examples of the organic peroxide usable as the curing agent include benzoyl peroxide, 2,4-dichlorobenzoyl peroxide, p-methylbenzoyl peroxide, 2,4-dicumyl peroxide, 2,5-dimethyl-(bis-2,5-tert-butylperoxy)hexane, di-tert-butyl peroxide, and tert-butyl perbenzoate.

The amount of the organic peroxide added is preferably 0.1 to 5 parts by weight and more preferably 0.5 to 2 parts by weight relative to 100 parts by weight of the component (B). When the amount of the organic peroxide added is less than 0.1 parts by weight, crosslinking reaction may insufficiently proceed, and when the amount exceeds 5 parts by weight, the residue of the organic peroxide after the reaction may remain in the composition.

<Composition>

Besides the above-described essential components, the silicone composition of the present invention may contain various additives as an optional component within a range in which the advantage of the present invention is not inhibited according to demand.

Within a range in which the object of the present invention, such as transparency, is not impaired, silica may be added to the silicone composition of the present invention. The silica is added for obtaining the composition having more excellent mechanical strength, and is preferably powder having a specific surface area of 50 m$^2$/g or more and more preferably in the range of 100 to 300 m$^2$/g. When the specific surface area is less than 50 m$^2$/g, the effect of increasing mechanical strength of a cured product tends to decrease. The specific surface area can be measured by, for example, a BET method.

Examples of such reinforcing silica include fumed silica, precipitated silica, fused silica, and silica prepared by hydrophobing the surfaces of these silica materials.

When the silica is added, the adding amount is preferably 5 to 70 parts by weight and more preferably 10 to 50 parts by weight relative to 100 parts by weight of the component (B). When the amount of the silica added is less than 5 parts by weight, the reinforcing effect of addition of silica may not be obtained, and when the amount exceeds 70 parts by weight, workability may be degraded, and mechanical strength and transparency may be decreased.

For the purpose of improving storage stability of the silicone composition of the present invention or controlling reactivity of hydrosilylation reaction in the curing process, a curing retardant can be used.

As the curing retardant, a known retardant can be used. Examples of the curing retardant include compounds containing an aliphatic unsaturated bond, organophosphorus compounds, organosulfur compounds, nitrogen-containing compounds, tin compounds, and organic peroxides. These curing retardants may be used alone or in combination of two or more.

Examples of compounds containing an aliphatic unsaturated bond include 3-hydroxy-3-methyl-1-butine, 3-hydroxy-3-phenyl-1-butine, propargyl alcohols such as 1-ethynyl-1-cyclohexanol, ene-ine compounds, maleic anhydride, maleic acid esters such as dimethyl maleate, and the like. Examples of organophosphorus compounds include triorganophosphines, diorganophosphines, organophosphones, triorganophosphites, and the like. Examples of organosulfur compounds include organomercaptans, diorganosulfides, hydrogen sulfide, benzothiazole, thiazole, benzothiazole disulfide, and the like. Examples of nitrogen-containing compounds include tetramethyl ethylene diamine, and the like. Examples of tin compounds include stannous halide dihydrates, stannous carboxylates, and the like. Examples of organic peroxides include di-tert-butyl peroxide, dicumyl peroxide, benzoyl peroxide, tert-butyl perbenzoate, and the like.

Among these curing retardants, benzothiazole, thiazole, dimethyl maleate, 3-hydroxy-3-methyl-1-butine, and 1-ethynyl-1-cyclohexanol are preferred from the viewpoint of high retardation activity and easy availability of raw materials.

When the curing retardant is added, the adding amount is not particularly limited, but is preferably in the range of $10^{-1}$ to $10^3$ moles and more preferably in the range of 1 to 100 moles relative to 1 mole of the hydrosilylation catalyst.

Other various additives include a filler serving as an extender (e.g., crushed quartz, calcium carbonate, or carbon), a colorant, a heat resistance improver, a reaction controller, a mold release agent, a filler dispersant (e.g., diphenylsilanediol, various alkoxysilanes, carbon functional silane, and silanol group-containing low-molecular-weight siloxane), and the like.

In addition, in order to impart flame retardancy and heat resistance to the silicone composition of the present invention, a known additive such as titanium dioxide, manganese carbonate, $Fe_2O_3$, ferrite, mica, glass fibers, or glass flakes may be added.

The amounts of these arbitrary components added are preferably minimized so as not to impair the advantage of the present invention.

The silicone composition of the present invention can be produced by mixing (A) the silicone polymer particles, (B) the polyorganosiloxane having at least one alkenyl group in its molecule, and (C) the curing agent and then uniformly dispersing the component (A) in the composition by the master batch method.

The silicone composition of the present invention can be produced by uniformly mixing the components (A) to (C) and, if required, the above-described additives using a kneading machine such as a two-roll mill, a Banbury mixer, and a kneader, or a planetary stirring deaerator and then, if required, heat-treating the resultant mixture.

When a cured product of the silicone composition is prepared, the curing temperature and the curing time can be appropriately selected in the ranges of 70° C. to 500° C. and 5 seconds to 5 hours, respectively, according to the type of the curing agents used, the adding amount thereof, and the curing method.

The silicone composition of the present invention can be used as a molded product. As a molding method, any molding method can be used, and examples thereof include extrusion molding, compression molding, blow molding, calendaring, vacuum molding, foaming, injection molding, and cast molding.

The silicone composition of the present invention can be used as a composition for optical materials. The term "optical materials" means general materials used for applications in which light such as visible light, infrared light, ultraviolet light, X-rays, or laser is transmitted through the materials.

Specifically, examples of such materials used in the field of liquid crystal displays include liquid crystal display peripheral materials such as a substrate material, a light guide plate, a prism sheet, a polarizing plate, a retardation film, a viewing angle correction film, an adhesive, and a film for liquid crystal such as a polarizer protecting film. Other examples include materials for color PDP (plasma display) which is expected as a next-generation flat panel display, such as a sealant, an anti-reflective film, an optical correction film, a housing material, a front glass protective film, a front glass alternative material, and an adhesive; materials used for LED display devices, such as a LED element molding material, a front glass protective film, a front glass alternative material, and an adhesive; materials for plasma addressed liquid crystal (PALC) displays, such as a substrate material, a light guide plate, a prism sheet, a polarizing plate, a retardation film, a viewing angle correction film, an adhesive, and a polarizer protecting film; materials for organic EL (electroluminescence) displays, such as a front glass protective film, a front glass alternative material, and an adhesive; and materials for field emission displays (FED), such as various film substrates, a front glass protective film, a front glass alternative material, and an adhesive.

Examples of the materials in the optical recording field include disk substrate materials, a pick-up lens, a protective film, a sealant, an adhesive, and the like for VD (video disk), CD/CD-ROM, CD-R/RW, DVD-R/DVD-RAM, MO/MD, PD (phase change disk), and optical cards.

Examples of the materials in the optical apparatus field include a lens material, a finder prism, a target prism, a finder cover, a light-receiving sensor, and the like for a still camera; a taking lens, a finder, and the like for a video camera; a projection lens, a protective film, a sealant, an adhesive, and the like for projection televisions; and a lens material, a sealant, an adhesive, a film, and the like for an optical sensing device.

Examples of the materials in the optical component field include a fiber material, a lens, a waveguide, an element sealant, an adhesive, and the like in the periphery of a light switch in an optical communication system; an optical fiber material, a ferrule, a sealant, an adhesive, and the like in the periphery of an optical connector; a lens, a waveguide, a LED element sealant, an adhesive, and the like for an optical passive component and an optical circuit component; and a substrate material, a fiber material, an element sealant, an adhesive, and the like in the periphery of an optoelectronic integrated circuit (OEIC).

Examples of the materials in the optical fiber field include an illumination, a light guide, and the like for a decorative display, sensors, displays, indicators, and the like for industrial applications, and optical fibers and the like for communication infrastructures and home digital device connection.

Examples of the materials in the periphery of a semiconductor integrated circuit include microlithographic resist materials and the like for LSI and super LSI materials.

Examples of the materials in the automobile and transport field include materials for automobiles, such as a lamp reflector, a bearing retainer, a gear part, a corrosion resistant coat, a switch part, a headlamp, an engine internal part, an illumination part, various interior and exterior parts, a drive engine, a break oil tank, an automobile rust-proof steel sheet, an interior panel, an interior material, a protective and bundling wireness, a combustion hose, an automobile lamp, and a glass alternative; double glass and the like for a railway vehicle; and a toughening agent for a structural material, an engine peripheral material, a protective and bundling wireness, a corrosion-resistant coat, and the like for an air craft.

Examples of the materials in the construction field include an interior processing material, an electric cover, a sheet, a glass intermediate film, a glass alternative, a solar cell peripheral material and the like. Examples of the materials in the agricultural field include films and the like for house covering.

Examples of next-generation optoelectronic functional organic materials include a substrate material, a fiber material, an element sealant, an adhesive, and the like for peripheral materials of next-generation DVD, organic EL devices, an organic photorefractive element, a light amplifier serving as a light-light conversion device, an optical computing element, and an organic solar cell.

ADVANTAGES OF THE INVENTION

According to the present invention, silicone polymer particles and a silicone composition having excellent tensile properties and transparency can be obtained and thus can be used as, for example, materials required to have high light-transmission, particularly transmission of short-wavelength light, and particularly used as sealants for various light-receiving and emitting devices.

BEST MODE FOR CARRYING OUT THE INVENTION

Although the present invention will be described in further detail on the basis of examples, the present invention is not limited to these examples.

In the examples and comparative examples, the volume-average particle diameter was measured using nanotrack particle diameter analyzer UPA150 (manufactured by Nikkiso Co., Ltd.).

EXAMPLE 1

In a four-neck flask provided with a stirrer, a reflux condenser, a monomer addition port, and a thermometer, 300 parts by weight of pure water was placed. Aside from this, a mixture containing 100 parts by weight of pure water, 0.5 parts by weight (solid content) of a 15 wt % aqueous solution of sodium dodecylbenzenesulfonate, 100 parts by weight of octamethylcyclotetrasiloxane, and 3 parts by weight of γ-methacryloxypropylmethyl dimethoxysilane was forcedly emulsified with a homomixer at 7,000 rpm for 5 minutes, and then the resultant emulsion was added to the four-neck flask at a time. After stirring for 5 minutes, 1 part by weight (solid content) of a 10 wt % aqueous solution of dodecylbenzenesulfonic acid was added to the flask, and then the resulting mixture was further stirred for 15 minutes, followed by heating of the system to 80° C. After the temperature reached 80° C., stirring was continued for 280 minutes, and then the system was cooled to 25° C. and aged for 20 hours to obtain a latex containing silicone particles (volume-average particle diameter: 0.3 μm).

In a five-neck flask provided with a stirrer, a reflux condenser, a nitrogen blowing port, a monomer addition port, and a thermometer, 80.0 parts by weight (solid content) of the silicone particles were charged and then heated to 40° C. in a nitrogen atmosphere. Aside from this, a mixture containing 50 parts by weight of pure water, 0.1 parts by weight (solid content) of a 5 wt % aqueous solution of sodium dodecylbenzenesulfonate, 24.8 parts by weight (corresponding to 10.0 parts by weight in terms of a complete condensate having a structural unit represented by $SiO_2$) of an ethyl silicate condensate (trade name, Ethyl Silicate 40, manufactured by Tama Chemicals Co., Ltd., $SiO_2$ content: 39.0 to 42.0% by weight, corresponding to a partial condensate of tetrafunctional alkoxysilane), and 20.3 parts by weight of trimethoxymethylsilane (corresponding to 10.0 parts by weight in terms of a complete condensate having a structural unit represented by $CH_3SiO_{3/2}$) was forcedly emulsified with a homomixer at 7,000 rpm for 5 minutes, and then the resultant emulsion was added dropwise to the five-neck flask over 160 minutes. The solution was stirred for 24 hours while being kept at 40° C. to obtain a latex containing silicone polymer particles (volume-average particle diameter: 0.3 μm) as the component (A).

Then, 180 parts by weight of methyl ethyl ketone was added to 20 parts by weight of the resin solid content of the latex (resin solid content: 22% by weight) containing the component (A) to aggregate the particles, followed by centrifugal sedimentation with a centrifugal separator at 6,000 rpm for 20 minutes. The resultant precipitate was dispersed in a mixed solvent of methyl ethyl ketone/methanol=1/1 (vol/vol) and washed, followed by centrifugal sedimentation with a centrifugal separator at 6,000 rpm for 20 minutes. This washing was carried out a total of ten times, and then 380 parts by weight of toluene was added to 20 parts by weight of the resultant precipitate to prepare a toluene solution of the component (A).

Further, in a four-neck flask provided with a rubber septum for reagent addition, a nitrogen blowing port, a nitrogen outlet port, a thermometer, and a stirring bar for a magnetic stirrer, 400 parts by weight (resin solid content: 20 parts by weight) of the toluene solution of the component (A) was charged and cooled in an iced water bath, and 8.0 parts by weight of chlorotrimethylsilane was added dropwise under stirring. The resultant solution was stirred for 1 hour in the iced-water bath and for 6 hours at room temperature to prepare a toluene solution of the component (A) in which silanol groups on the particle surfaces were converted to methyl groups by surface treatment.

The solution after the reaction was washed twice with 400 parts by weight of a 3 wt % aqueous NaHCO$_3$ solution each time and three times with 400 parts by weight of pure water each time. Next, 100 parts by weight of vinyl-terminated polydimethylsiloxane, DMS-V31 manufactured by Gelest Inc., was mixed with 20 parts by weight of the resin solid content of the solution, and the mixture was concentrated with a rotary evaporator to distill off toluene. Then, 4.4 parts by weight of methylhydrogen siloxane-dimethylsiloxane copolymer, HMS-301 manufactured by Gelest Inc., and 0.012 parts by weight (solid content) of a 10 wt % isopropyl alcohol solution of dimethyl maleate were added to the mixture. Further, 0.55 parts by weight of an isopropyl alcohol solution of a platinum vinylsiloxane complex (containing 0.03% by weight of platinum) was added to the mixture, followed by stirring and defoaming with a planetary stirring deaerator to obtain a silicone composition. The resultant composition was poured into a mold and heated in air at 180° C. for 30 minutes to prepare a transparent silicone cured product of 2 mm in thickness in which the component (A) containing methyl groups converted from silanol groups on the particle surfaces by surface treatment was mixed by the so-called master batch method.

FIG. 1 shows a transmission microscope photograph (cryo-ultramicrotomy RuO$_4$ staining) of the resulting cured product. It was confirmed from the photograph that the silicone particles are coated with the alkoxysilane condensate to form a core-shell structure.

EXAMPLE 2

In a four-neck flask provided with a stirrer, a reflux condenser, a monomer addition port, and a thermometer, 300 parts by weight of pure water was placed. Aside from this, a mixture containing 100 parts by weight of pure water, 0.5 parts by weight (solid content) of a 15 wt % aqueous solution of sodium dodecylbenzenesulfonate, 100 parts by weight of octamethylcyclotetrasiloxane, and 3 parts by weight of γ-methacryloxypropylmethyl dimethoxysilane was forcedly emulsified with a homomixer at 7,000 rpm for 5 minutes, and then the resultant emulsion was added to the four-neck flask at a time. After stirring for 5 minutes, 1 part by weight (solid content) of a 10 wt % aqueous solution of dodecylbenzenesulfonic acid was added to the flask, and then the resulting mixture was further stirred for 15 minutes, followed by heating of the system to 80° C. After the temperature reached 80° C., stirring was continued for 280 minutes, and then the system was cooled to 25° C. and aged for 20 hours to obtain a latex containing silicone particles (volume-average particle diameter: 0.3 μm).

In a five-neck flask provided with a stirrer, a reflux condenser, a nitrogen blowing port, a monomer addition port, and a thermometer, 80.0 parts by weight (solid content) of the silicone particles were charged and then heated to 40° C. in a nitrogen atmosphere. Aside from this, a mixture containing 50 parts by weight of pure water, 0.1 parts by weight (solid content) of a 5 wt % aqueous solution of sodium dodecylbenzenesulfonate, 24.8 parts by weight (corresponding to 10.0 parts by weight in terms of a complete condensate having a structural unit represented by SiO$_2$) of an ethyl silicate condensate (trade name, Ethyl Silicate 40, manufactured by Tama Chemicals Co., Ltd., SiO$_2$ content: 39.0 to 42.0% by weight, corresponding to a partial condensate of tetrafunctional alkoxysilane), and 20.3 parts by weight of trimethoxymethylsilane (corresponding to 10.0 parts by weight in terms of a complete condensate having a structural unit represented by CH$_3$SiO$_{3/2}$) was forcedly emulsified with a homomixer at 7,000 rpm for 5 minutes, and then the resultant emulsion was added dropwise to the five-neck flask over 160 minutes. The solution was stirred for 24 hours while being kept at 40° C. to obtain a latex containing silicone polymer particles (volume-average particle diameter: 0.3 μm) as the component (A).

Then, 180 parts by weight of methyl ethyl ketone was added to 20 parts by weight of the resin solid content of the latex (resin solid content: 22% by weight) containing the component (A) to aggregate the particles, followed by centrifugal sedimentation with a centrifugal separator at 6,000 rpm for 20 minutes. The resultant precipitate was dispersed in a mixed solvent of methyl ethyl ketone/methanol=1/1 (vol/vol) and washed, followed by centrifugal sedimentation with a centrifugal separator at 6,000 rpm for 20 minutes. This washing was carried out a total of ten times, and then 380 parts by weight of toluene was added to 20 parts by weight of the resultant precipitate to prepare a toluene solution of the component (A).

Further, in a four-neck flask provided with a rubber septum for reagent addition, a nitrogen blowing port, a nitrogen outlet port, a thermometer, and a stirring bar for a magnetic stirrer, 400 parts by weight (resin solid content: 20 parts by weight) of the toluene solution of the component (A) was charged and cooled in an iced water bath, and 8.0 parts by weight of chlorodimethylvinylsilane was added dropwise under stirring. The resultant solution was stirred for 1 hour in the iced-water bath and for 6 hours at room temperature to prepare a toluene solution of the component (A) in which silanol groups on the particle surfaces were converted to vinyl groups by surface treatment.

The solution after the reaction was washed twice with 400 parts by weight of a 3 wt % aqueous NaHCO$_3$ solution each time and three times with 400 parts by weight of pure water each time. Next, 100 parts by weight of vinyl-terminated polydimethylsiloxane, DMS-V31 manufactured by Gelest Inc., was mixed with 20 parts by weight of the resin solid content of the solution, and the mixture was concentrated with a rotary evaporator to distill off toluene. Then, 4.4 parts by weight of methylhydrogen siloxane-dimethylsiloxane copolymer, HMS-301 manufactured by Gelest Inc., and 0.012 parts by weight (solid content) of a 10 wt % isopropyl alcohol solution of dimethyl maleate were added to the mixture. Further, 0.55 parts by weight of an isopropyl alcohol solution of a platinum vinylsiloxane complex (containing 0.03% by weight of platinum) was added to the mixture, followed by stirring and defoaming with a planetary stirring deaerator to obtain a silicone composition. The resultant composition was poured into a mold and heated in air at 180° C. for 30 minutes to prepare a transparent silicone cured product of 2 mm in thickness in which the component (A) containing vinyl groups converted from silanol groups on the particle surfaces by surface treatment was mixed by the so-called master batch method.

EXAMPLE 3

In a five-neck flask provided with a stirrer, a reflux condenser, a nitrogen blowing port, a monomer addition port, and a thermometer, 400 parts by weight of pure water and 12 parts by weight (solid content) of a 10 wt % aqueous solution of sodium dodecylbenzenesulfonate were mixed. Then, the resultant mixture was heated to 50° C. in a nitrogen atmosphere. Then, 10 parts by weight of butyl acrylate (BA), 3 parts by weight of tert-dodecyl mercaptan, and 0.01 parts by weight (solid content) of para-menthane hydroperoxide were added to the mixture. After thirty minutes, 0.18 parts by weight of sodium formaldehyde sulfoxylate (SFS), 0.019 parts by weight of disodium ethylenediaminetetraacetate (EDTA), and 0.019 parts by weight of ferrous sulfate were added, followed by stirring for 1 hour. Then, a mixture containing 90 parts by weight of BA, 27 parts by weight of tert-dodecyl mercaptan, and 0.18 parts by weight (solid content) of para-menthane hydroperoxide was continuously added over 3 hours. Further, post-polymerization was performed for 1 hour to prepare a latex containing a seed polymer (volume-average particle diameter: 0.008 µm).

In a five-neck flask provided with a stirrer, a reflux condenser, a nitrogen blowing port, a monomer addition port, and a thermometer, 2.0 parts by weight (solid content) of the seed polymer, 3.0 parts by weight of 10 wt % dodecylbenzenesulfonic acid, and 300 parts by weight of pure water (containing pure water carried from the latex containing the seed polymer) were charged. After stirring for 15 minutes, the system was heated to 80° C. in a nitrogen atmosphere. Aside from this, a mixture containing 150 parts by weight of pure water, 0.5 parts by weight (solid content) of a 5 wt % aqueous solution of sodium dodecylbenzenesulfonate, 100 parts by weight of octamethylcyclotetrasiloxane, and 3 parts by weight of γ-methacryloxypropylmethyl dimethoxysilane was forcedly emulsified with a homomixer at 7,000 rpm for 5 minutes, and then the resultant mixture was continuously added to the five-neck flask over 5 hours. After further post-polymerization for 2 hours, the reaction solution was cooled to 25° C. and allowed to stand for 20 hours. Then, the pH was controlled to 6.5 with sodium hydroxide to terminate the polymerization, thereby to obtain a latex containing silicone particles (volume-average particle diameter: 0.07 µm).

In a five-neck flask provided with a stirrer, a reflux condenser, a nitrogen blowing port, a monomer addition port, and a thermometer, 80 parts by weight (solid content) of the silicone particles were charged and then heated to 40° C. in a nitrogen atmosphere. Aside from this, a mixture containing 50 parts by weight of pure water, 0.6 parts by weight (solid content) of a 5 wt % aqueous solution of sodium dodecylbenzenesulfonate, 24.8 parts by weight (corresponding to 10.0 parts by weight in terms of a complete condensate having a structural unit represented by $SiO_2$) of an ethyl silicate condensate (trade name, Ethyl Silicate 40, manufactured by Tama Chemicals Co., Ltd., $SiO_2$ content: 39.0 to 42.0% by weight, corresponding to a partial condensate of tetrafunctional alkoxysilane), and 20.3 parts by weight of trimethoxymethylsilane (corresponding to 10.0 parts by weight in terms of a complete condensate having a structural unit represented by $CH_3SiO_{3/2}$) was forcedly emulsified with a homomixer at 7,000 rpm for 5 minutes, and then the resultant emulsion was added dropwise to the five-neck flask over 60 minutes. The solution was stirred for 24 hours while being kept at 40° C. to obtain a latex containing silicone polymer particles (volume-average particle diameter: 0.08 µm) as the component (A).

Then, 180 parts by weight of methyl ethyl ketone was added to 20 parts by weight of the resin solid content of the latex (resin solid content: 17% by weight) containing the component (A) to aggregate the particles, followed by centrifugal sedimentation with a centrifugal separator at 6,000 rpm for 20 minutes. The resultant precipitate was dispersed in a mixed solvent of methyl ethyl ketone/methanol=1/1 (vol/vol) and washed, followed by centrifugal sedimentation with a centrifugal separator at 6,000 rpm for 20 minutes. This washing was carried out a total of ten times, and then 380 parts by weight of toluene was added to 20 parts by weight of the resultant precipitate to prepare a toluene solution of the component (A).

Further, in a five-neck flask provided with a rubber septum for reagent addition, a nitrogen blowing port, a nitrogen outlet port, a thermometer, and a stirring bar for a magnetic stirrer, 400 parts by weight (resin solid content: 20 parts by weight) of the toluene solution of the component (A) was charged and cooled in an iced water bath, and 8.0 parts by weight of chlorotrimethylsilane was added dropwise under stirring. The resultant solution was stirred for 1 hour in the iced-water bath and for 6 hours at room temperature to prepare a toluene solution of the component (A) in which silanol groups on the particle surfaces were converted to methyl groups by surface treatment.

The solution after the reaction was washed twice with 400 parts by weight of a 3 wt % aqueous $NaHCO_3$ solution each time and three times with 400 parts by weight of pure water each time. Next, 100 parts by weight of vinyl-terminated polydimethylsiloxane, DMS-V31 manufactured by Gelest Inc., was mixed with 20 parts by weight of the resin solid content of the solution, and the mixture was concentrated with a rotary evaporator to distill off toluene. Then, 4.4 parts by weight of methylhydrogen siloxane-dimethylsiloxane copolymer, HMS-301 manufactured by Gelest Inc., and 0.012 parts by weight (solid content) of a 10 wt % isopropyl alcohol solution of dimethyl maleate were added to the mixture. Further, 0.55 parts by weight of an isopropyl alcohol solution of a platinum vinylsiloxane complex (containing 0.03% by weight of platinum) was added to the mixture, followed by stirring and defoaming with a planetary stirring deaerator to obtain a silicone composition. The resultant composition was poured into a mold and heated in air at 180° C. for 30 minutes to prepare a transparent silicone cured product of 2 mm in thickness in which the component (A) containing methyl groups converted from silanol groups on the particle surfaces by surface treatment was mixed by the so-called master batch method.

COMPARATIVE EXAMPLE 1

First, 4.4 parts by weight of methylhydrogen siloxane-dimethylsiloxane copolymer, HMS-301 manufactured by Gelest Inc., and 0.012 parts by weight (solid content) of a 10 wt % isopropyl alcohol solution of dimethyl maleate were added to 100 parts by weight of vinyl-terminated polydimethylsiloxane, DMS-V31 manufactured by Gelest Inc. Further, 0.55 parts by weight of an isopropyl alcohol solution of a platinum vinylsiloxane complex (containing 0.03% by weight of platinum) was added to the mixture, followed by stirring and defoaming with a planetary stirring deaerator. The resultant mixture was poured into a mold and heated in air at 180° C. for 30 minutes to prepare a transparent silicone cured product of 2 mm in thickness.

COMPARATIVE EXAMPLE 2

In a four-neck flask provided with a stirrer, a reflux condenser, a monomer addition port, and a thermometer, 300 parts by weight of pure water was placed. Aside from this, a mixture containing 100 parts by weight of pure water, 0.5 parts by weight (solid content) of a 15 wt % aqueous solution of sodium dodecylbenzenesulfonate, 100 parts by weight of octamethylcyclotetrasiloxane, and 3 parts by weight of γ-methacryloxypropylmethyl dimethoxysilane was forcedly emulsified with a homomixer at 7,000 rpm for 5 minutes, and then the resultant emulsion was added to the four-neck flask at a time. After stirring for 5 minutes, 1 part by weight (solid content) of a 10 wt % aqueous solution of dodecylbenzenesulfonic acid was added to the flask, and then the resulting mixture was further stirred for 15 minutes, followed by heating of the system to 80° C. After the temperature reached 80° C., stirring was continued for 280 minutes, and then the system was cooled to 25° C. and aged for 20 hours to obtain a latex containing silicone particles (volume-average particle diameter: 0.3 µm).

Then, 180 parts by weight of methyl ethyl ketone was added to 20 parts by weight of the resin solid content of the latex (resin solid content: 22% by weight) to aggregate the particles, followed by centrifugal sedimentation with a centrifugal separator at 6,000 rpm for 20 minutes. The resultant precipitate was dispersed in a mixed solvent of methyl ethyl ketone/methanol=1/1 (vol/vol) and washed, followed by centrifugal sedimentation with a centrifugal separator at 6,000 rpm for 20 minutes. This washing was carried out a total of ten times, and then 380 parts by weight of toluene was added to 20 parts by weight of the resultant precipitate to prepare a toluene solution of the silicone particles.

Next, 100 parts by weight of vinyl-terminated polydimethylsiloxane, DMS-V31 manufactured by Gelest, Inc., was mixed with 20 parts by weight of the resin solid content of the solution, and the mixture was concentrated with a rotary evaporator to distill off toluene. Then, 4.4 parts by weight of methylhydrogen siloxane-dimethylsiloxane copolymer, HMS-301 manufactured by Gelest Inc., and 0.012 parts by weight (solid content) of a 10 wt % isopropyl alcohol solution of dimethyl maleate were added to the mixture. Further, 0.55 parts by weight of an isopropyl alcohol solution of a platinum vinylsiloxane complex (containing 0.03% by weight of platinum) was added to the mixture, followed by stirring and defoaming with a planetary stirring deaerator. The resultant mixture was poured into a mold and heated in air at 180° C. for 30 minutes to prepare a transparent silicone cured product of 2 mm in thickness in which the silicone particles were mixed by the so-called master batch method.

COMPARATIVE EXAMPLE 3

First, 20 parts by weight of fumed silica, SIS6962 (catalog value of particle diameter: 0.02 µm) manufactured by Gelest Inc., was mixed with 100 parts by weight of vinyl-terminated polydimethylsiloxane, DMS-V31 manufactured by Gelest Inc., followed by stirring and defoaming with a planetary stirring deaerator. Then, 4.4 parts by weight of methylhydrogen siloxane-dimethylsiloxane copolymer, HMS-301 manufactured by Gelest Inc., and 0.012 parts by weight (solid content) of a 10 wt % isopropyl alcohol solution of dimethyl maleate were added to the mixture. Further, 0.55 parts by weight of an isopropyl alcohol solution of a platinum vinylsiloxane complex (containing 0.03% by weight of platinum) was added to the mixture, followed by stirring and defoaming with a planetary stirring deaerator. The resultant mixture was poured into a mold and heated in air at 180° C. for 30 minutes to prepare a clouded silicone cured product of 2 mm in thickness which contained fumed silica.

COMPARATIVE EXAMPLE 4

First, 20 parts by weight of polyorganosilsesquioxane-coated silicone rubber powder, KMP-601 (catalog value of particle diameter: 2 to 25 µm) manufactured by Shin-Etsu Chemical Co., Ltd., was mixed with 100 parts by weight of vinyl-terminated polydimethylsiloxane, DMS-V31 manufactured by Gelest Inc., followed by stirring and defoaming with a planetary stirring deaerator. Then, 4.4 parts by weight of methylhydrogen siloxane-dimethylsiloxane copolymer, HMS-301 manufactured by Gelest Inc., and 0.012 parts by weight (solid content) of a 10 wt % isopropyl alcohol solution of dimethyl maleate were added to the mixture. Further, 0.55 parts by weight of an isopropyl alcohol solution of a platinum vinylsiloxane complex (containing 0.03% by weight of platinum) was added to the mixture, followed by stirring and defoaming with a planetary stirring deaerator. The resultant mixture was poured into a mold and heated in air at 180° C. for 30 minutes to prepare a clouded silicone cured product of 2 mm in thickness which contained polyorganosilsesquioxane-coated silicone rubber powder.

The physical properties of the cured products prepared in Examples 1 to 3 and Comparative Examples 1 to 4 were measured and evaluated as described below. The results are shown in Table 1.

<Test Method>

(Tensile Properties (Mechanical Strength))

According to the method described in JIS K7113, Autograph AG-10TB manufactured by Shimadzu Corporation was used for measurement. Average values of strength (MPa) and elongation (%) at breakage of a test piece were determined by the measurement of n=3. As the test piece, a cured product having a shape of No. 2(1/3) and a thickness of 2 mm was used. The test was conducted at 23° C. and a test rate of 500 mm/min. As a rule, the test piece was conditioned at a temperature of 23±2° C. and a relative humidity of 50±5% for 24 hours or more before the test.

(Property of Cured Product)

The transparency of a test piece of 2 mm in thickness was visually evaluated.

TABLE 1

| | | | Particle diameter (μm) | Tensile strength (MPa) | Tensile elongation (%) | Property of cured product |
|---|---|---|---|---|---|---|
| Example 1 | Component (A) | Core/shell = silicone/alkoxysilane condensate Methyl group introduced into particle surface | 0.3 | 1.6 | 213 | Transparent |
| Example 2 | | Core/shell = silicone/alkoxysilane condensate Vinyl group introduced into particle surface | 0.3 | 2.2 | 223 | Transparent |
| Example 3 | | Core/shell = silicone/alkoxysilane condensate Methyl group introduced into particle surface | 0.08 | 0.92 | 190 | Transparent |
| Comp. Example 1 | Mixture | — | — | 0.48 | 94 | Transparent |
| Comp. Example 2 | | Silicone particle | 0.3 | 0.52 | 104 | Transparent |
| Comp. Example 3 | | Fumed silica SIS6962 (manufactured by Gelest Inc.) | 0.02 | 1.9 | 225 | Cloudy |
| Comp. Example 4 | | Polyorgano silsesquioxane-coated silicone rubber KMP-601 (manufactured by Shin-Etsu Chemical Co., Ltd.)) | 2~25 | 0.88 | 158 | Transparent (containing aggregate) |

EXAMPLE 4

In a four-neck flask provided with a stirrer, a reflux condenser, a monomer addition port, and a thermometer, 300 parts by weight of pure water was placed. Aside from this, a mixture containing 100 parts by weight of pure water, 0.5 parts by weight (solid content) of a 15 wt % aqueous solution of sodium dodecylbenzenesulfonate, 100 parts by weight of octamethylcyclotetrasiloxane, and 3 parts by weight of γ-methacryloxypropylmethyl dimethoxysilane was forcedly emulsified with a homomixer at 7,000 rpm for 5 minutes, and then the resultant emulsion was added to the four-neck flask at a time. After stirring for 5 minutes, 1 part by weight (solid content) of a 10 wt % aqueous solution of dodecylbenzenesulfonic acid was added to the flask, and then the resulting mixture was further stirred for 15 minutes, followed by heating of the system to 80° C. After the temperature reached 80° C., stirring was continued for 280 minutes, and then the system was cooled to 25° C. and aged for 20 hours to obtain a latex containing silicone particles (volume-average particle diameter: 0.3 μm).

In a five-neck flask provided with a stirrer, a reflux condenser, a nitrogen blowing port, a monomer addition port, and a thermometer, 17.8 parts by weight (solid content) of the silicone particles were charged and then heated to 40° C. in a nitrogen atmosphere. Aside from this, a mixture containing 50 parts by weight of pure water, 0.1 parts by weight (solid content) of a 5 wt % aqueous solution of sodium dodecylbenzenesulfonate, 24.8 parts by weight (corresponding to 10.0 parts by weight in terms of a complete condensate having a structural unit represented by $SiO_2$) of an ethyl silicate condensate (trade name, Ethyl Silicate 40, manufactured by Tama Chemicals Co., Ltd., $SiO_2$ content: 39.0 to 42.0% by weight, corresponding to a partial condensate of tetrafunctional alkoxysilane), and 20.3 parts by weight of trimethoxymethylsilane (corresponding to 10.0 parts by weight in terms of a complete condensate having a structural unit represented by $CH_3SiO_{3/2}$) was forcedly emulsified with a homomixer at 7,000 rpm for 5 minutes, and then the resultant emulsion was added dropwise to the five-neck flask over 160 minutes. The solution was stirred for 24 hours while being kept at 40° C. to obtain a latex containing silicone polymer (volume-average particle diameter: 0.3 μm) as the component (A).

Then, 180 parts by weight of methyl ethyl ketone was added to 20 parts by weight of the resin solid content of the latex (resin solid content: 22% by weight) containing the component (A) to aggregate the particles, followed by centrifugal sedimentation with a centrifugal separator at 6,000 rpm for 20 minutes. The resultant precipitate was dispersed in a mixed solvent of methyl ethyl ketone/methanol=1/1 (vol/vol) and washed, followed by centrifugal sedimentation with a centrifugal separator at 6,000 rpm for 20 minutes. This washing was carried out a total of ten times, and then 380 parts by weight of toluene was added to 20 parts by weight of the resultant precipitate to prepare a toluene solution of the component (A).

Further, in a four-neck flask provided with a rubber septum for reagent addition, a nitrogen blowing port, a nitrogen outlet port, a thermometer, and a stirring bar for a magnetic stirrer, 400 parts by weight (resin solid content: 20 parts by weight) of the toluene solution of the component (A) was charged and cooled in an iced water bath, and 2.8 parts by weight of chlorotrimethylsilane was added dropwise under stirring. The resultant solution was stirred for 1 hour in the iced-water bath and for 7 hours at room temperature to prepare a toluene solution of the component (A) in which silanol groups on the particle surfaces were converted to methyl groups by surface treatment.

The solution after the reaction was washed twice with 400 parts by weight of a 3 wt % aqueous NaHCO$_3$ solution each time and three times with 400 parts by weight of pure water each time. Next, 50 parts by weight of thermosetting silicone rubber, JCR6115B liquid (manufactured by Dow Corning Toray Silicone Co., Ltd.), was mixed with 20 parts by weight of the resin solid content of the solution, and the mixture was concentrated with a rotary evaporator to distill off toluene. Then, 50 parts by weight of JCR6115A liquid (manufactured by Dow Corning Toray Silicone Co., Ltd.), was added to the residue, followed by stirring and defoaming with a planetary stirring deaerator to obtain a silicone composition. The resultant composition was poured into a mold and heated in air at 100° C. for 1 hour to prepare a transparent silicone rubber cured product of 2 mm in thickness which contained the component (A) having methyl groups converted from silanol groups on the particle surfaces by surface treatment.

COMPARATIVE EXAMPLE 5

JCR6115A and B liquids in equal amounts were added and then stirred and defoamed with a planetary stirring deaerator. The resultant mixture was poured into a mold and heated in air at 100° C. for 1 hour to prepare a transparent silicone rubber cured product of 2 mm in thickness.

COMPARATIVE EXAMPLE 6

In a four-neck flask provided with a stirrer, a reflux condenser, a monomer addition port, and a thermometer, 300 parts by weight of pure water was placed. Aside from this, a mixture containing 100 parts by weight of pure water, 0.5 parts by weight (solid content) of a 15 wt % aqueous solution of sodium dodecylbenzenesulfonate, 100 parts by weight of octamethylcyclotetrasiloxane, and 3 parts by weight of γ-methacryloxypropylmethyl dimethoxysilane was forcedly emulsified with a homomixer at 7,000 rpm for 5 minutes, and then the resultant emulsion was added to the four-neck flask at a time. After stirring for 5 minutes, 1 part by weight (solid content) of a 10 wt % aqueous solution of dodecylbenzenesulfonic acid was added to the flask, and then the resulting mixture was further stirred for 15 minutes, followed by heating of the system to 80° C. After the temperature reached 80° C., stirring was continued for 280 minutes, and then the system was cooled to 25° C. to obtain a latex containing silicone rubber particles (volume-average particle diameter: 0.3 μm).

Then, methyl ethyl ketone was added so that the solid content in the latex was 10% by weight to aggregate the particles, followed by centrifugal sedimentation with a centrifugal separator at 6,000 rpm for 20 minutes. The resultant precipitate was dispersed in a mixed solvent of methyl ethyl ketone/methanol=1/1 (vol/vol) and washed, followed by centrifugal sedimentation with a centrifugal separator at 6,000 rpm for 20 minutes. This washing was carried out a total of three times, and then n-hexane was added to the resultant precipitate so that the solid content was 5 wt % to prepare an n-hexane solution of the silicone rubber particles.

Next, thermosetting silicone rubber, JCR6115B liquid manufactured by Dow Corning Toray Silicone Co., Ltd., was mixed so that the solid content of the silicone rubber particles was 40% by weight. The resultant mixture was concentrated with a rotary evaporator, and then JCR6115A liquid in the same amount as JCR6115B was added to the residue, followed by stirring and defoaming with a planetary stirring deaerator. The resultant mixture was poured into a mold and heated in air at 100° C. for 1 hour to prepare a transparent silicone rubber cured product of 2 mm in thickness which contained 20 parts by weight of silicone rubber particles.

COMPARATIVE EXAMPLE 7

JCR6115A and B liquids in equal amounts were added and then stirred and defoamed with a planetary stirring deaerator. Then, 20 parts by weight of fused silica (manufactured by Denki Kagaku Kogyo K. K., FB-74, average particle diameter 30 μm) was mixed relative to 100 parts by weight of the resultant mixture, followed by stirring and defoaming with a planetary stirring deaerator. The mixture was then poured into a mold and heated in air at 100° C. for 1 hour to prepare a clouded silicone rubber cured product of 2 mm in thickness.

COMPARATIVE EXAMPLE 8

JCR6115A and B liquid in equal amounts were added and then stirred and defoamed with a planetary stirring deaerator. Then, 20 parts by weight of silicone rubber particles (manufactured by Shin-Etsu Chemical Co. Ltd, X-52-875, average particle diameter 40 μm) was mixed relative to 100 parts by weight of the resultant mixture, followed by stirring and defoaming with a planetary stirring deaerator. The mixture was then poured into a mold and heated in air at 100° C. for 1 hour to prepare a transparent silicone rubber cured product of 2 mm in thickness.

COMPARATIVE EXAMPLE 9

JCR6115A and B liquid in equal amounts were added and then stirred and defoamed with a planetary stirring deaerator. Then, 20 parts by weight of silicone resin-coated silicone rubber particles (manufactured by Shin-Etsu Chemical Co., Ltd., KMP-602, average particle diameter 30 μm) was mixed relative to 100 parts by weight of the resultant mixture, followed by stirring and defoaming with a planetary stirring deaerator. The mixture was then poured into a mold and heated in air at 100° C. for 1 hour to prepare a transparent silicone rubber cured product of 2 mm in thickness.

The physical properties of the cured products prepared in Example 4 and Comparative Examples 5 to 9 were measured and evaluated by the same method as described above. The results are shown in Table 2.

TABLE 2

|  | Tensile strength (MPa) | Tensile elongation (%) | Property of cured product |
| --- | --- | --- | --- |
| Example 4 | 0.69 | 134 | Transparent |
| Comp. Example 5 | 0.44 | 121 | Transparent |
| Comp. Example 6 | 0.55 | 158 | Transparent |
| Comp. Example 7 | 0.22 | 50 | Clouded |
| Comp. Example 8 | 0.41 | 96 | Transparent |
| Comp. Example 9 | 0.59 | 122 | Transparent |

As described above, the silicone polymer particles as the component (A) obtained in the present invention are capable of increasing the tensile strength of a silicone composition and providing a transparent composition.

EXAMPLE 5

In a five-neck flask provided with a stirrer, a reflux condenser, a nitrogen blowing port, a monomer addition port, and a thermometer, 400 parts by weight of pure water and 12 parts by weight (solid content) of a 10 wt % aqueous solution of sodium dodecylbenzenesulfonate were mixed. Then, the resultant mixture was heated to 50° C. in a nitrogen atmosphere. Then, 10 parts by weight of butyl acrylate (BA), 3 parts by weight of tert-dodecyl mercaptan, and 0.01 parts by weight (solid content) of para-menthane hydroperoxide were added to the mixture. After thirty minutes, 0.18 parts by weight of sodium formaldehyde sulfoxylate (SFS), 0.019 parts by weight of disodium ethylenediaminetetraacetate (EDTA), and 0.019 parts by weight of ferrous sulfate were added, followed by stirring for 1 hour. Then, a mixture containing 90 parts by weight of BA, 27 parts by weight of tert-dodecyl mercaptan, and 0.18 parts by weight (solid content) of para-menthane hydroperoxide was continuously added over 3 hours. Further, post-polymerization was performed for 1 hour to prepare a latex containing a seed polymer (volume-average particle diameter: 0.008 μm).

In a five-neck flask provided with a stirrer, a reflux condenser, a nitrogen blowing port, a monomer addition port, and a thermometer, 2.0 parts by weight (solid content) of the seed polymer, 3.0 parts by weight of 10 wt % dodecylbenzenesulfonic acid, and 300 parts by weight of pure water (containing pure water carried from the latex containing the seed polymer) were charged. After stirring for 15 minutes, the system was heated to 80° C. in a nitrogen atmosphere. Aside from this, a mixture containing 150 parts by weight of pure water, 0.5 parts by weight (solid content) of a 5 wt % aqueous solution of sodium dodecylbenzenesulfonate, 100 parts by weight of octamethylcyclotetrasiloxane, and 3 parts by weight of γ-methacryloxypropylmethyl dimethoxysilane was forcedly emulsified with a homomixer at 7,000 rpm for 5 minutes, and then the resultant mixture was continuously added to the five-neck flask over 5 hours. After further post-polymerization for 2 hours, the reaction solution was cooled to 25° C. and allowed to stand for 20 hours. Then, the polymerization was terminated to obtain a latex containing silicone particles (volume-average particle diameter: 0.011 μm).

In a five-neck flask provided with a stirrer, a reflux condenser, a nitrogen blowing port, a monomer addition port, and a thermometer, 80 parts by weight (solid content) of the silicone particles were charged and then heated to 40° C. in a nitrogen atmosphere. Aside from this, a mixture containing 50 parts by weight of pure water, 0.6 parts by weight (solid content) of a 5 wt % aqueous solution of sodium dodecylbenzenesulfonate, 24.8 parts by weight (corresponding to 10.0 parts by weight in terms of a complete condensate having a structural unit represented by $SiO_2$) of an ethyl silicate condensate (trade name, Ethyl Silicate 40, manufactured by Tama Chemicals Co., Ltd., $SiO_2$ content: 39.0 to 42.0% by weight, corresponding to a partial condensate of tetrafunctional alkoxysilane), and 20.3 parts by weight of trimethoxymethylsilane (corresponding to 10.0 parts by weight in terms of a complete condensate having a structural unit represented by $CH_3SiO_{3/2}$) was forcedly emulsified with a homomixer at 7,000 rpm for 5 minutes, and then the resultant emulsion was added dropwise to the five-neck flask over 60 minutes. The solution was stirred for 24 hours while being kept at 40° C. to obtain a latex containing silicone polymer particles (volume-average particle diameter: 0.011 μm) as the component (A).

INDUSTRIAL APPLICABILITY

According to the present invention, silicone polymer particles and a silicone composition which have excellent tensile properties and transparency can be obtained and thus used as, for example, a material required to have high transmittance, particularly transmittance of short-wavelength light, and particularly used as a sealant for various light receiving and emitting devices.

BRIEF DESCRIPTION OF THE DRAWING

FIG. 1 is a transmission microscope photograph of a silicone composition of Example 1.

The invention claimed is:
1. A silicone composition comprising
(A) a silicone polymer particle having a silicone core-alkoxysilane condensate shell structure comprising a silicone particle with a volume-average particle diameter of 0.001 to 1.0μm, wherein the silicone particle substantially consists of a polyorganosiloxane, and is directly coated with an alkoxysilane condensate,
(B) a polyorganosiloxane having at least one alkenyl group in its molecule, and
(C) a curing agent.
2. The silicone polymer particle according to claim 1, wherein the volume-average particle diameter of the silicone particle is 0.01 to 1.0 μm.
3. The silicone polymer particle according to claim 1, the silicone polymer particle being further surface-treated.
4. The silicone polymer particle according to claim 1, wherein an alkenyl group is contained in the shell or the surface of the polymer particle.
5. The silicone composition according to claim 1, wherein the curing agent is a combination of an organohydrogen polysiloxane and a hydrosilylation catalyst or an organic peroxide.
6. The silicone composition according to claim 1, wherein the component (A) is uniformly dispersed in the composition by a master batch method.
7. A method of manufacturing a silicone polymer particle having a silicone core-alkoxysilane condensate shell structure comprising a silicone particle with a volume-average particle diameter of 0.001 to 1.0 μm, wherein the silicone particle substantially consists of a polyorganosiloxane, and is directly coated with an alkoxysilane condensate, the method comprising coating a silicone particle produced by emulsion polymerization with an alkoxysilane condensate by condensation reaction of alkoxysilane.
8. The method of manufacturing the silicone polymer particle according to claim 7, wherein the silicone particle is obtained by emulsion polymerization of organosiloxane with a cyclic structure used as a raw material.
9. The method of manufacturing the silicone polymer particle according to claim 7, wherein the condensation reaction of alkoxysilane is performed under acid conditions.
10. The method of manufacturing the silicone polymer particle according to claim 7, further comprising surface treatment.
11. A method of manufacturing a silicone composition, the method comprising mixing (A) the silicone polymer particle according to claim 1, (B) a polyorganosiloxane having at least one alkenyl group in its molecule, and (C) a curing agent, and uniformly dispersing the component (A) in the composition by a master batch method.

* * * * *